US009844057B2

(12) United States Patent
Gaal et al.

(10) Patent No.: US 9,844,057 B2
(45) Date of Patent: Dec. 12, 2017

(54) CHANNEL USAGE BEACON SIGNAL DESIGN FOR COOPERATIVE COMMUNICATION SYSTEMS

(71) Applicant: QUALCOMM Incorporated, San Diego, CA (US)

(72) Inventors: Peter Gaal, San Diego, CA (US); Naga Bhushan, San Diego, CA (US); Wanshi Chen, San Diego, CA (US); Hao Xu, San Diego, CA (US); Srinivas Yerramalli, San Diego, CA (US); Aleksandar Damnjanovic, Del Mar, CA (US); Tao Luo, San Diego, CA (US); Durga Prasad Malladi, San Diego, CA (US); Yongbin Wei, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 14/518,744

(22) Filed: Oct. 20, 2014

(65) Prior Publication Data
US 2015/0110066 A1 Apr. 23, 2015

Related U.S. Application Data

(60) Provisional application No. 61/893,776, filed on Oct. 21, 2013.

(51) Int. Cl.
H04W 72/04 (2009.01)
H04W 72/12 (2009.01)
(Continued)

(52) U.S. Cl.
CPC ..... *H04W 72/0453* (2013.01); *H04L 27/0006* (2013.01); *H04W 16/14* (2013.01); *H04W 72/1226* (2013.01); *H04W 74/0808* (2013.01)

(58) Field of Classification Search
None
See application file for complete search history.

(56) References Cited

U.S. PATENT DOCUMENTS

| 2007/0072638 | A1  | 3/2007 | Yang et al. | |
| 2009/0323608 | A1* | 12/2009 | Adachi | H04W 48/18 370/329 |
| 2013/0217399 | A1  | 8/2013 | Xhafa et al. | |

FOREIGN PATENT DOCUMENTS

WO    WO-2013103754 A1    7/2013

OTHER PUBLICATIONS

"IEEE Standard for Information Technology—Telecommunications and information exchange between systems—Local and metropolitan area networks—Specific requirements Part 11: Wireless LAN Medium Access Control (MAC) and Physical Layer (PHY) Specifications" 802.11-2007. Published 2007, pp. 114-115.*

(Continued)

Primary Examiner — Khaled Kassim
Assistant Examiner — Zhaohui Yang
(74) Attorney, Agent, or Firm — Liem T. Do

(57) ABSTRACT

Design of channel usage beacon signals (CUBS) in cooperative networks is disclosed. After detecting a clear channel assessment (CCA), a transmitter selects a configuration of a CUBS associated with the transmitter based on the CCA opportunity assigned to the network. The configuration of the CUBS associated with the transmitter may include a set of frequency subcarriers for CUBS transmissions. The transmitter transmits the CUBS according to transmission characteristics based on the CCA opportunity. In additional aspects, randomization may be introduced into the fre- (Continued)

quency subcarrier allocations of CUBS configurations where the transmitter receives assignment of virtual frequency subcarriers for CUBS transmissions and maps the virtual subcarrier to physical frequency subcarriers for CUBS transmission. Additional aspects allow for pattern offset values to be determined independently from the transmitter cell identifier. In such aspects, the assigned pattern offsets may be cell identifier-independent, while others may be cell identifier-dependent.

25 Claims, 13 Drawing Sheets

(51) Int. Cl.
    *H04L 27/00*     (2006.01)
    *H04W 16/14*     (2009.01)
    *H04W 74/08*     (2009.01)

(56) References Cited

OTHER PUBLICATIONS

International Search Report and Written Opinion—PCT/US214/06525-ISA/EPO—dated Jan. 19, 2015.

* cited by examiner

CHANNEL USAGE BEACON SIGNAL DESIGN FOR COOPERATIVE COMMUNICATION SYSTEMS

CROSS-REFERENCE TO RELATED APPLICATIONS

This application claims the benefit of U.S. Provisional Patent Application No. 61/893,776, entitled, "CHANNEL USAGE BEACON SIGNAL DESIGN FOR COOPERATIVE COMMUNICATION SYSTEMS", filed on Oct. 21, 2013, which is expressly incorporated by reference herein in its entirety.

BACKGROUND

Field

Aspects of the present disclosure relate generally to wireless communication systems, and more particularly, to channel usage beacon signal (CUBS) design for cooperative communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes detecting, by a transmitter in preparation for transmission of a set of data over an unlicensed band, a clear channel assessment (CCA) in a CCA opportunity assigned to a network of the transmitter, selecting, by the transmitter, a configuration of a channel usage beacon signal (CUBS) associated with the transmitter based on the CCA opportunity assigned to the network of the transmitter, wherein the configuration of the CUBS associated with the transmitter includes a set of frequency subcarriers for CUBS transmissions, and transmitting, by the transmitter, the CUBS according to transmission characteristics based on the CCA opportunity.

In an additional aspect of the disclosure, a method of wireless communication includes detecting, by a receiver, a CUBS in a clear CCA opportunity assigned to a network of the receiver, wherein a configuration of the CUBS identifies a transmitter in communication with the receiver, setting an automatic gain control (AGC) by the receiver based on the CUBS, determining, by the receiver, an expected transmission time from the transmitter based on the configuration, receiving, by the receiver, data transmissions from the transmitter within the expected transmission time using the AGC, and deactivating the receiving after the expected transmission time.

In an additional aspect of the disclosure, an apparatus configured for wireless communication includes means for detecting, by a transmitter in preparation for transmission of a set of data over an unlicensed band, a clear CCA in a CCA opportunity assigned to a network of the transmitter, means for selecting, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and means for transmitting, by the transmitter, the CUBS according to transmission characteristics based on the CCA opportunity.

In an additional aspect of the disclosure, an apparatus configured for wireless communication includes means for detecting, by a receiver, a CUBS in a clear CCA opportunity assigned to a network of the receiver, wherein a configuration of the CUBS identifies a transmitter in communication with the receiver, means for setting an AGC by the receiver based on the CUBS, means for determining, by the receiver, an expected transmission time from the transmitter based on the configuration, means for receiving, by the receiver, data transmissions from the transmitter within the expected transmission time using the AGC, and means for deactivating the receiving after the expected transmission time.

In an additional aspect of the disclosure, a computer-readable medium having program code recorded thereon. This program code includes code to detect, by a transmitter in preparation for transmission of a set of data over an unlicensed band, a clear CCA in a CCA opportunity assigned to a network of the transmitter, code to select, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and code to transmit, by the transmitter, the CUBS according to transmission characteristics based on the CCA opportunity.

In an additional aspect of the disclosure, a computer-readable medium having program code recorded thereon. This program code includes code to detect, by a receiver, a CUBS in a clear CCA opportunity assigned to a network of the receiver, wherein a configuration of the CUBS identifies a transmitter in communication with the receiver, code to set an AGC by the receiver based on the CUBS, code to determine, by the receiver, an expected transmission time from the transmitter based on the configuration, code to receive, by the receiver, data transmissions from the transmitter within the expected transmission time using the AGC, and code to deactivate the receiving after the expected transmission time.

In an additional aspect of the disclosure, an apparatus includes at least one processor and a memory coupled to the processor. The processor is configured to detect, by a transmitter in preparation for transmission of a set of data over an unlicensed band, a clear CCA in a CCA opportunity assigned to a network of the transmitter, to select, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and to transmit, by the transmitter, the CUBS according to transmission characteristics based on the CCA opportunity.

In an additional aspect of the disclosure, an apparatus includes at least one processor and a memory coupled to the processor. The processor is configured to detect, by a receiver, a CUBS in a clear CCA opportunity assigned to a network of the receiver, wherein a configuration of the CUBS identifies a transmitter in communication with the receiver, the processor is further configured to set an AGC by the receiver based on the CUBS, to determine, by the receiver, an expected transmission time from the transmitter based on the configuration, to receive, by the receiver, data transmissions from the transmitter within the expected transmission time using the AGC, and to deactivate the receiving after the expected transmission time.

In an additional aspect of the disclosure, a method of wireless communication includes receiving, at a transmitter, a configuration of a CUBS associated with the transmitter based on a CCA opportunity assigned to a network of the transmitter, wherein the configuration of the CUBS associated with the transmitter includes a set of virtual frequency subcarriers identified for CUBS transmission by the transmitter. The method also includes mapping, by the transmitter, the set of virtual frequency subcarriers to a set of physical frequency subcarriers for CUBS transmission by the transmitter and transmitting, by the transmitter, the CUBS according to the configuration on the set of physical frequency subcarriers.

The described mapping of the disclosed method may also include mapping the set of virtual frequency subcarriers to the set of physical frequency subcarriers by a permutation of the set of virtual frequency subcarriers.

The described permutations may also be a pseudorandom permutation or may be one of a plurality of permutations of the set of virtual frequency subcarriers, the permutation being assigned to the CCA opportunity assigned to the network. Such the permutation of the plurality of permutations may be randomly assigned to the CCA opportunity.

In an additional aspect of the disclosure, a method of wireless communication includes detecting, by a transmitter in preparation for transmission of a set of data over an unlicensed band, a clear CCA in a CCA opportunity assigned to a network of the transmitter, selecting, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and transmitting, by the transmitter, the CUBS according to transmission characteristics based on the CCA opportunity.

The described one or more frequency subcarriers of the set of frequency subcarriers for CUBS transmission may be determined independently from the cell identifier (cell ID) associated with the transmitter. The described method may also include a scrambling sequence of the CUBS is determined dependent on the cell ID of the transmitter.

In an additional aspect of the disclosure, a method of wireless communication includes receiving, at a transmitter, a transmission sequence configuration of a CUBS associated with the transmitter based on a CCA opportunity assigned to a network of the transmitter, wherein the transmission sequence configuration of the CUBS associated with the transmitter includes an identification of transmission sequence for the CUBS over a set of frequency subcarriers within each resource element of a plurality of symbols associated with the CCA opportunity, and transmitting, by the transmitter, the CUBS over the set of frequency subcarriers identified in the transmission sequence, wherein either two consecutive CUBS transmissions are transmitted over one or more frequency subcarriers of the set of frequency subcarriers which are free from colliding neighbor CUBS transmissions for the CCA opportunity of each except a last of a plurality of available CCA opportunities, or the CUBS transmission of the transmitter in the network assigned to the last of the plurality of available CCA opportunities is transmitted over a frequency subcarrier of the set of frequency subcarriers which is free from colliding neighbor CUBS transmissions.

The two consecutive CUBS transmissions of the described aspect may also be transmitted over two different frequency subcarriers of the set of frequency subcarriers or transmitted over a same frequency subcarrier of the set of frequency subcarriers.

In an additional aspect of the disclosure, a method of wireless communication includes listening, at a receiver, for a CUBS transmission from a transmitter, detecting a first transmission on a first unlicensed subcarrier of a plurality of frequency subcarriers identified for CUBS transmissions from the transmitter, detecting a second transmission on a second unlicensed subcarrier of the plurality of frequency subcarriers identified for CUBS transmissions from the transmitter, and decoding the first transmission and the second transmission to determine whether the first and second transmissions are the CUBS transmission from the transmitter.

The described first unlicensed subcarrier may be different from the second unlicensed subcarrier, wherein the decoding includes decoding the first transmission separately from the second transmission. The described first unlicensed subcarrier may also be the same as the second unlicensed subcarrier, wherein the decoding includes combining the first transmission and the second transmission into a combined transmission and decoding the combined transmission.

In an additional aspect of the disclosure, an apparatus configured for wireless communication includes means for receiving, at a transmitter, a configuration of a CUBS associated with the transmitter based on a CCA opportunity assigned to a network of the transmitter, wherein the configuration of the CUBS associated with the transmitter includes a set of virtual frequency subcarriers identified for CUBS transmission by the transmitter. The method also includes means for mapping, by the transmitter, the set of virtual frequency subcarriers to a set of physical frequency subcarriers for CUBS transmission by the transmitter and means for transmitting, by the transmitter, the CUBS according to the configuration on the set of physical frequency subcarriers.

The described means for mapping of the disclosed apparatus may also include means for mapping the set of virtual frequency subcarriers to the set of physical frequency subcarriers by a permutation of the set of virtual frequency subcarriers.

The described permutations may also be a pseudorandom permutation or may be one of a plurality of permutations of the set of virtual frequency subcarriers, the permutation being assigned to the CCA opportunity assigned to the network. Such the permutation of the plurality of permutations may be randomly assigned to the CCA opportunity.

In an additional aspect of the disclosure, an apparatus configured for wireless communication includes means for detecting, by a transmitter in preparation for transmission of a set of data over an unlicensed band, a clear CCA in a CCA opportunity assigned to a network of the transmitter, means for selecting, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and means for transmitting, by the transmitter, the CUBS according to transmission characteristics based on the CCA opportunity.

The described one or more frequency subcarriers of the set of frequency subcarriers for CUBS transmission may be determined independently from the cell identifier (cell ID) associated with the transmitter. The described apparatus may also include a scrambling sequence of the CUBS is determined dependent on the cell ID of the transmitter.

In an additional aspect of the disclosure, an apparatus configured for wireless communication includes means for receiving, at a transmitter, a transmission sequence configuration of a CUBS associated with the transmitter based on a CCA opportunity assigned to a network of the transmitter, wherein the transmission sequence configuration of the CUBS associated with the transmitter includes an identification of transmission sequence for the CUBS over a set of frequency subcarriers within each resource element of a plurality of symbols associated with the CCA opportunity, and means for transmitting, by the transmitter, the CUBS over the set of frequency subcarriers identified in the transmission sequence, wherein either two consecutive CUBS transmissions are transmitted over one or more frequency subcarriers of the set of frequency subcarriers which are free from colliding neighbor CUBS transmissions for the CCA opportunity of each except a last of a plurality of available CCA opportunities, or the CUBS transmission of the transmitter in the network assigned to the last of the plurality of available CCA opportunities is transmitted over a frequency subcarrier of the set of frequency subcarriers which is free from colliding neighbor CUBS transmissions.

The two consecutive CUBS transmissions of the described aspect may also be transmitted over two different frequency subcarriers of the set of frequency subcarriers or transmitted over a same frequency subcarrier of the set of frequency subcarriers.

In an additional aspect of the disclosure, an apparatus configured for wireless communication includes means for listening, at a receiver, for a CUBS transmission from a transmitter, means for detecting a first transmission on a first unlicensed subcarrier of a plurality of frequency subcarriers identified for CUBS transmissions from the transmitter, means for detecting a second transmission on a second unlicensed subcarrier of the plurality of frequency subcarriers identified for CUBS transmissions from the transmitter, and means for decoding the first transmission and the second transmission to determine whether the first and second transmissions are the CUBS transmission from the transmitter.

The described first unlicensed subcarrier may be different from the second unlicensed subcarrier, wherein the means for decoding includes decoding the first transmission separately from the second transmission. The described first unlicensed subcarrier may also be the same as the second unlicensed subcarrier, wherein the means for decoding includes means for combining the first transmission and the second transmission into a combined transmission and means for decoding the combined transmission.

In an additional aspect of the disclosure, a computer-readable medium having program code recorded thereon. This program code includes code to receive, at a transmitter, a configuration of a CUBS associated with the transmitter based on a CCA opportunity assigned to a network of the transmitter, wherein the configuration of the CUBS associated with the transmitter includes a set of virtual frequency subcarriers identified for CUBS transmission by the transmitter. The program code also includes code to map, by the transmitter, the set of virtual frequency subcarriers to a set of physical frequency subcarriers for CUBS transmission by the transmitter and code to transmit, by the transmitter, the CUBS according to the configuration on the set of physical frequency subcarriers.

The described code to map of the disclosed program code may also include code to map the set of virtual frequency subcarriers to the set of physical frequency subcarriers by a permutation of the set of virtual frequency subcarriers.

The described permutations may also be a pseudorandom permutation or may be one of a plurality of permutations of the set of virtual frequency subcarriers, the permutation being assigned to the CCA opportunity assigned to the network. Such the permutation of the plurality of permutations may be randomly assigned to the CCA opportunity.

In an additional aspect of the disclosure, a computer-readable medium having program code recorded thereon. This program code includes code to detect, by a transmitter in preparation for transmission of a set of data over an unlicensed band, a clear CCA in a CCA opportunity assigned to a network of the transmitter, code to select, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and code to transmit, by the transmitter, the CUBS according to transmission characteristics based on the CCA opportunity.

The described one or more frequency subcarriers of the set of frequency subcarriers for CUBS transmission may be determined independently from the cell identifier (cell ID) associated with the transmitter. The described program code may also include a scrambling sequence of the CUBS is determined dependent on the cell ID of the transmitter.

In an additional aspect of the disclosure, a computer-readable medium having program code recorded thereon.

This program code includes code to receive, at a transmitter, a transmission sequence configuration of a CUBS associated with the transmitter based on a CCA opportunity assigned to a network of the transmitter, wherein the transmission sequence configuration of the CUBS associated with the transmitter includes an identification of transmission sequence for the CUBS over a set of frequency subcarriers within each resource element of a plurality of symbols associated with the CCA opportunity, and code to transmit, by the transmitter, the CUBS over the set of frequency subcarriers identified in the transmission sequence, wherein either two consecutive CUBS transmissions are transmitted over one or more frequency subcarriers of the set of frequency subcarriers which are free from colliding neighbor CUBS transmissions for the CCA opportunity of each except a last of a plurality of available CCA opportunities, or the CUBS transmission of the transmitter in the network assigned to the last of the plurality of available CCA opportunities is transmitted over a frequency subcarrier of the set of frequency subcarriers which is free from colliding neighbor CUBS transmissions.

The two consecutive CUBS transmissions of the described aspect may also be transmitted over two different frequency subcarriers of the set of frequency subcarriers or transmitted over a same frequency subcarrier of the set of frequency subcarriers.

In an additional aspect of the disclosure, a computer-readable medium having program code recorded thereon. This program code includes code to listen, at a receiver, for a CUBS transmission from a transmitter, code to detect a first transmission on a first unlicensed subcarrier of a plurality of frequency subcarriers identified for CUBS transmissions from the transmitter, code to detect a second transmission on a second unlicensed subcarrier of the plurality of frequency subcarriers identified for CUBS transmissions from the transmitter, and code to decode the first transmission and the second transmission to determine whether the first and second transmissions are the CUBS transmission from the transmitter.

The described first unlicensed subcarrier may be different from the second unlicensed subcarrier, wherein the code to decode includes code to decode the first transmission separately from the second transmission. The described first unlicensed subcarrier may also be the same as the second unlicensed subcarrier, wherein the code to decode includes code to combine the first transmission and the second transmission into a combined transmission and code to decode the combined transmission.

In an additional aspect of the disclosure, an apparatus includes at least one processor and a memory coupled to the processor. The processor is configured to receive, at a transmitter, a configuration of a CUBS associated with the transmitter based on a CCA opportunity assigned to a network of the transmitter, wherein the configuration of the CUBS associated with the transmitter includes a set of virtual frequency subcarriers identified for CUBS transmission by the transmitter. The apparatus also includes configuration of the at processor to map, by the transmitter, the set of virtual frequency subcarriers to a set of physical frequency subcarriers for CUBS transmission by the transmitter and to transmit, by the transmitter, the CUBS according to the configuration on the set of physical frequency subcarriers.

The described configuration of the processor to map of the disclosed apparatus may also include configuration to map the set of virtual frequency subcarriers to the set of physical frequency subcarriers by a permutation of the set of virtual frequency subcarriers.

The described permutations may also be a pseudorandom permutation or may be one of a plurality of permutations of the set of virtual frequency subcarriers, the permutation being assigned to the CCA opportunity assigned to the network. Such the permutation of the plurality of permutations may be randomly assigned to the CCA opportunity.

In an additional aspect of the disclosure, an apparatus includes at least one processor and a memory coupled to the processor. The processor is configured to detect, by a transmitter in preparation for transmission of a set of data over an unlicensed band, a clear CCA in a CCA opportunity assigned to a network of the transmitter, to select, by the transmitter, a configuration of a CUBS associated with the transmitter based on the CCA opportunity assigned to the network of the transmitter, wherein the configuration of the CUBS associated with the transmitter includes a set of frequency subcarriers for CUBS transmissions, and to transmit, by the transmitter, the CUBS according to transmission characteristics based on the CCA opportunity.

The described one or more frequency subcarriers of the set of frequency subcarriers for CUBS transmission may be determined independently from the cell identifier (cell ID) associated with the transmitter. The described apparatus may also include a scrambling sequence of the CUBS is determined dependent on the cell ID of the transmitter.

In an additional aspect of the disclosure, an apparatus includes at least one processor and a memory coupled to the processor. The processor is configured to receive, at a transmitter, a transmission sequence configuration of a CUBS associated with the transmitter based on a CCA opportunity assigned to a network of the transmitter, wherein the transmission sequence configuration of the CUBS associated with the transmitter includes an identification of transmission sequence for the CUBS over a set of frequency subcarriers within each resource element of a plurality of symbols associated with the CCA opportunity, and to transmit, by the transmitter, the CUBS over the set of frequency subcarriers identified in the transmission sequence, wherein either two consecutive CUBS transmissions are transmitted over one or more frequency subcarriers of the set of frequency subcarriers which are free from colliding neighbor CUBS transmissions for the CCA opportunity of each except a last of a plurality of available CCA opportunities, or the CUBS transmission of the transmitter in the network assigned to the last of the plurality of available CCA opportunities is transmitted over a frequency subcarrier of the set of frequency subcarriers which is free from colliding neighbor CUBS transmissions.

The two consecutive CUBS transmissions of the described aspect may also be transmitted over two different frequency subcarriers of the set of frequency subcarriers or transmitted over a same frequency subcarrier of the set of frequency subcarriers.

In an additional aspect of the disclosure, an apparatus includes at least one processor and a memory coupled to the processor. The processor is configured to listen, at a receiver, for a CUBS transmission from a transmitter, to detect a first transmission on a first unlicensed subcarrier of a plurality of frequency subcarriers identified for CUBS transmissions from the transmitter, to detect a second transmission on a second unlicensed subcarrier of the plurality of frequency subcarriers identified for CUBS transmissions from the transmitter, and to decode the first transmission and the second transmission to determine whether the first and second transmissions are the CUBS transmission from the transmitter.

The described first unlicensed subcarrier may be different from the second unlicensed subcarrier, wherein the configuration of the processor to decode includes configuration to decode the first transmission separately from the second transmission. The described first unlicensed subcarrier may also be the same as the second unlicensed subcarrier, wherein the configuration of the processor to decode includes configuration to combine the first transmission and the second transmission into a combined transmission and to decode the combined transmission.

DETAILED DESCRIPTION

Figure 1:
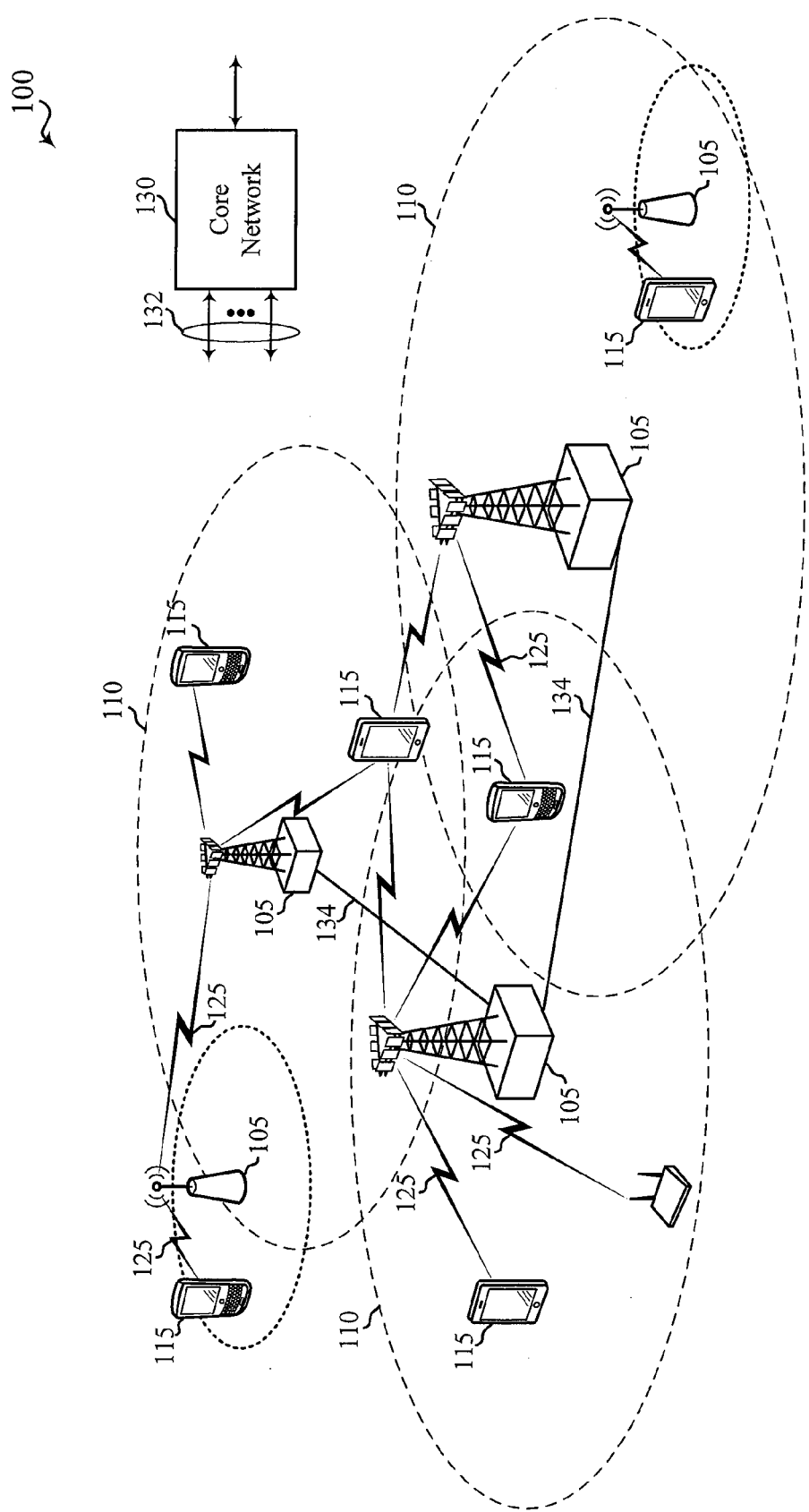
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE or LTE-Advanced (LTE-A) including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployments including unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE and LTE/LTE-A with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant LTE/LTE-A with unlicensed spectrum cell information (e.g., radio frame timing, common channel configuration, system frame number or SFN, etc.). In this mode, there may be close interworking between LTE with licensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network with licensed spectrum. In this case, there may be a loose interworking between LTE/LTE-A networks with licensed spectrum and LTE/LTE-A networks with unlicensed spectrum based on RLC-level aggregation with co-located LTE/LTE-A cells with unlicensed spectrum, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A network with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE/LTE-A network with licensed spectrum), an unlicensed spectrum (e.g., LTE/LTE-A network with unlicensed spectrum), or both. Similarly, the uplink transmissions may be made using a licensed spectrum (e.g., LTE/LTE-A network with licensed spectrum), an unlicensed spectrum (e.g., LTE/LTE-A network with unlicensed spectrum), or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A network with unlicensed spectrum deployment scenarios or modes of operation in a system such as the system 100, as well as other features and functions related to the operation of LTE/LTE-A with unlicensed spectrum, are provided below with reference to. FIGS. 2A-11C.

Figure 2A:
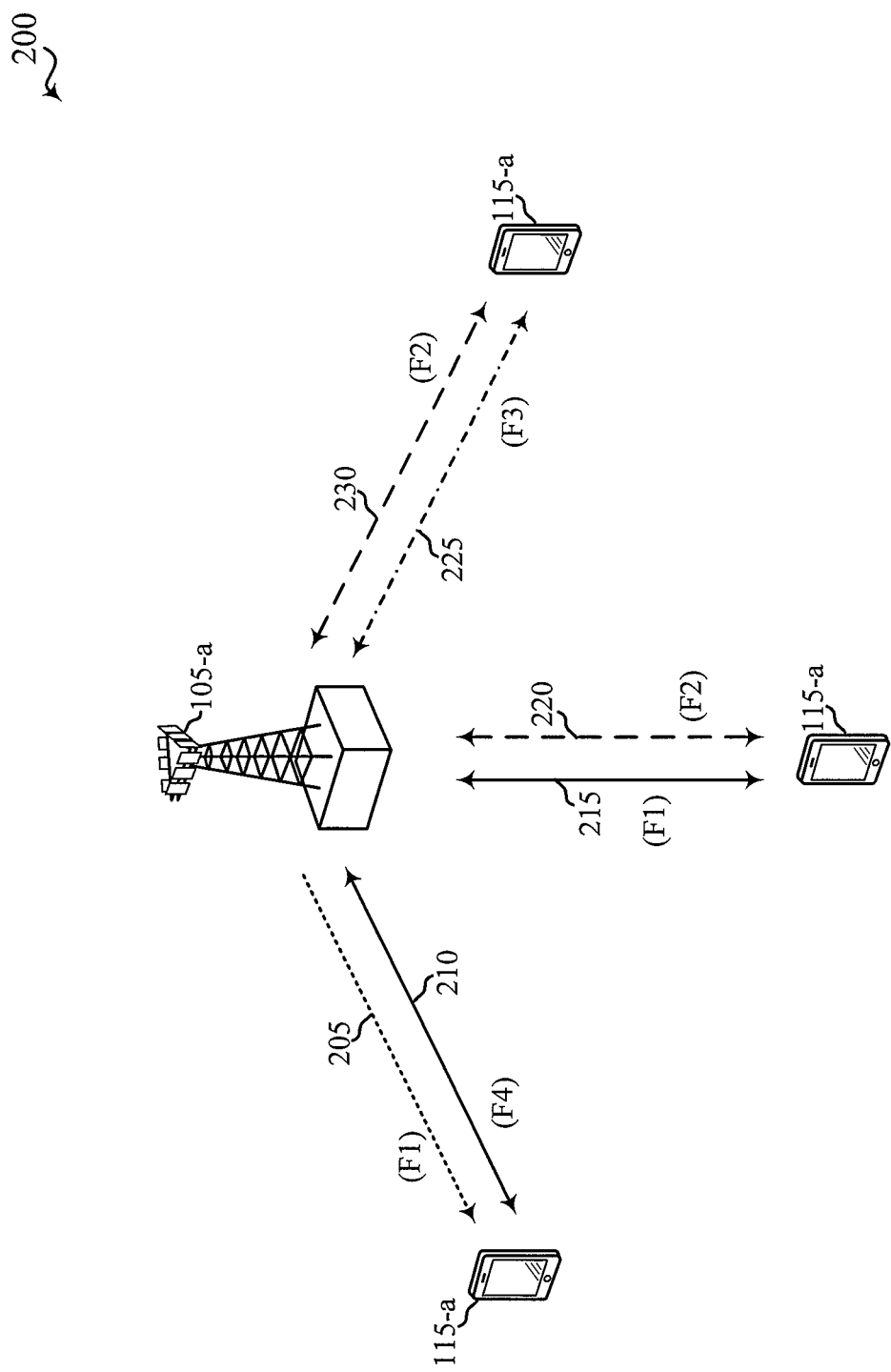
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE/LTE-A network with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE/LTE-A with unlicensed spectrum secondary component carrier (SCC) on the unlicensed spectrum.

In the supplemental downlink mode, control for LTE/LTE-A network with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225).

The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
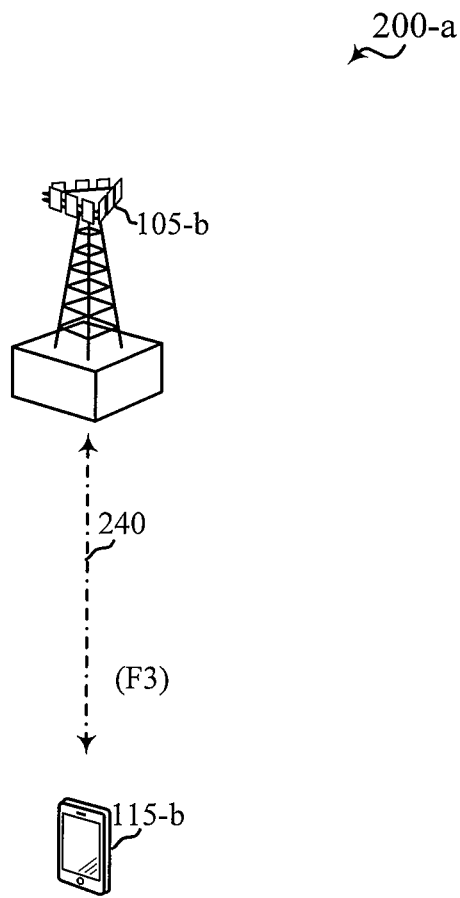
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE/LTE-A PCC on the unlicensed spectrum. Moreover, LBT may be implemented on both the base station and the UE.

Figure 3:
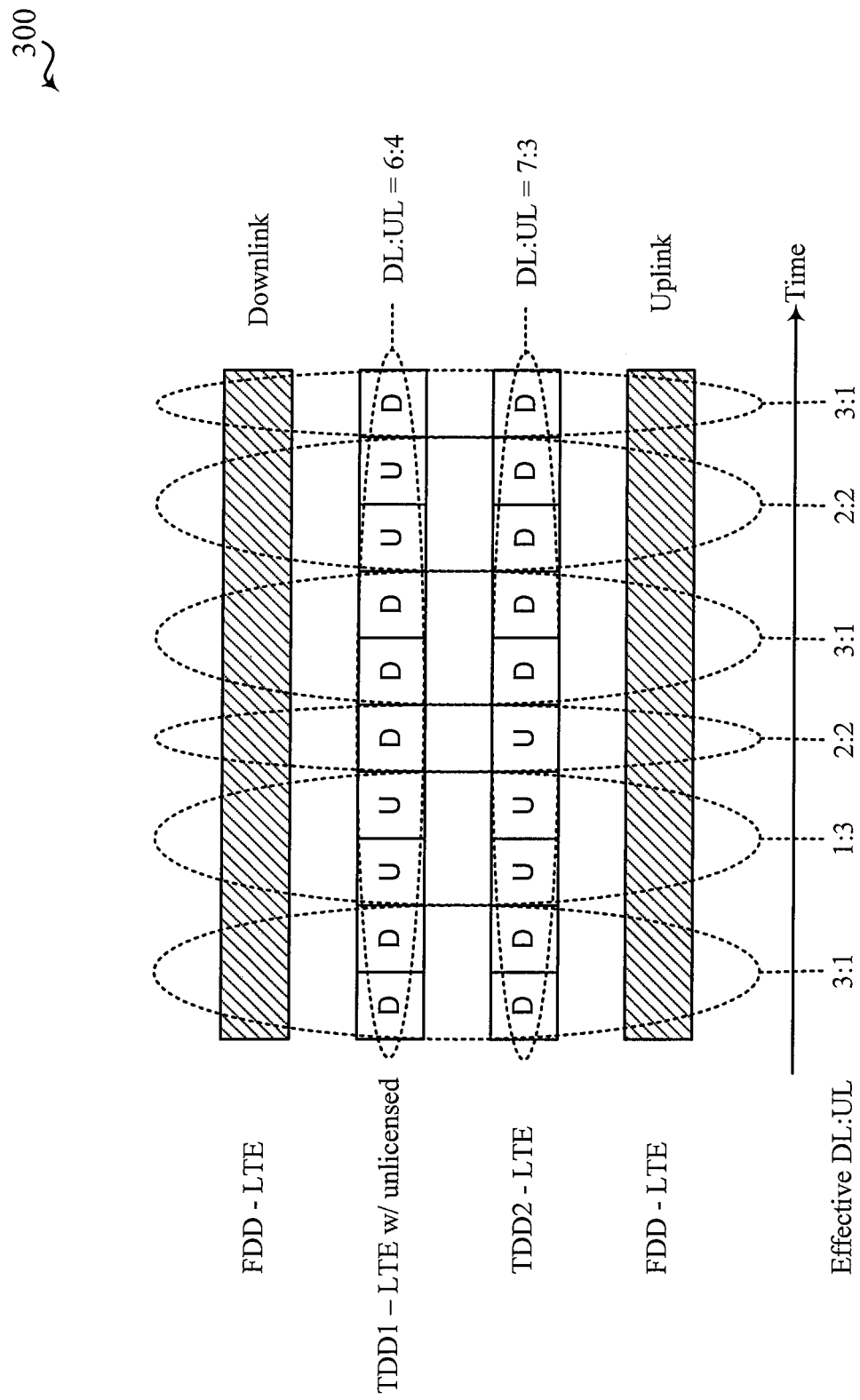
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
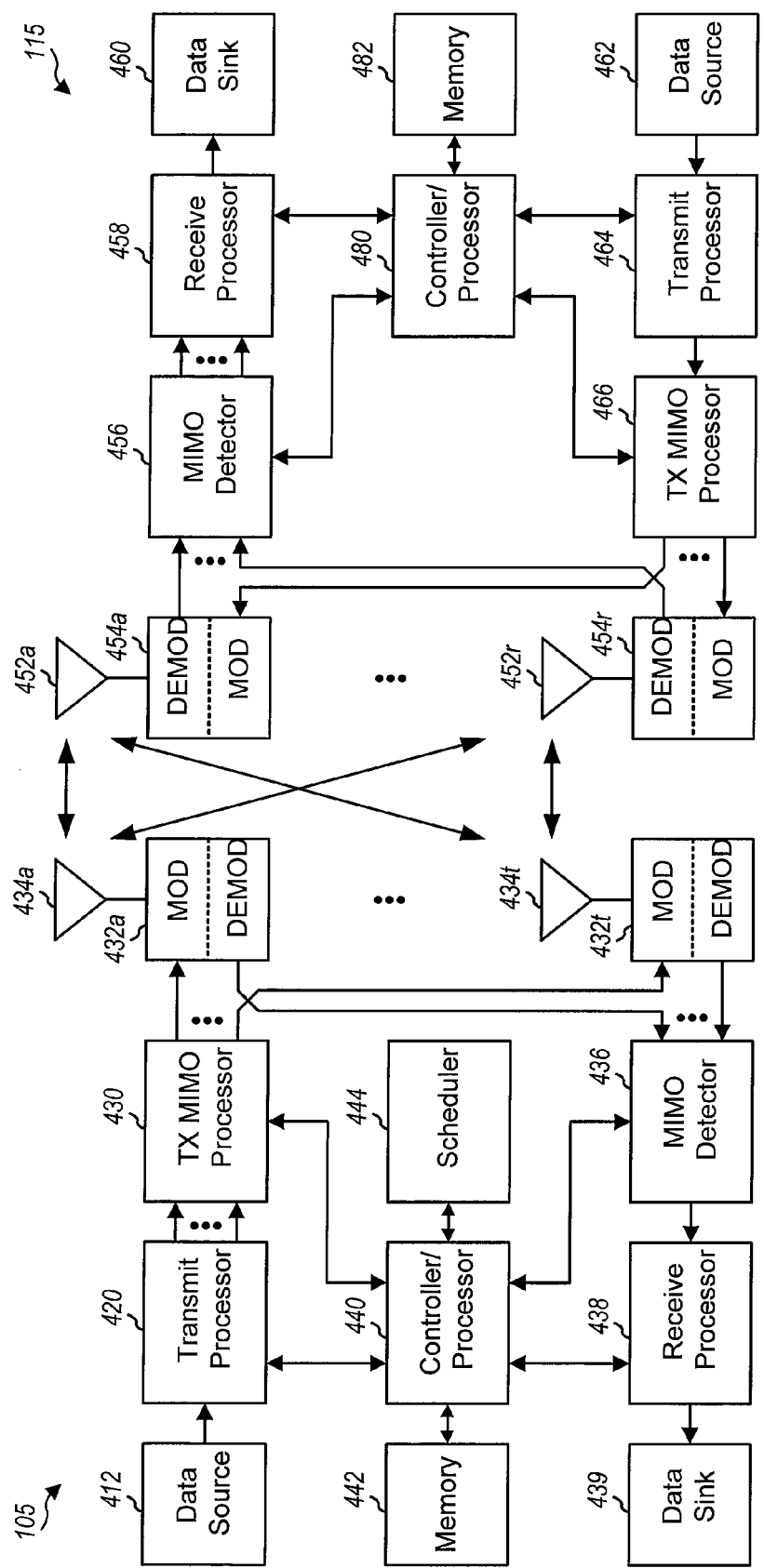
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7 and 8, and/or other processes for the techniques described herein. The memories 442 and 482 may store data and program codes for the eNB 105 and the UE 115, respectively. A scheduler 444 may schedule UEs for data transmission on the downlink and/or uplink.

In LTE/LTE-A system deployments with unlicensed band carriers using 'listen before talk" (LBT) techniques, the transmitting device should sense the channel before initiating transmissions. In a synchronized LTE/LTE-A system with unlicensed spectrum, competing deployments can take turns accessing the unlicensed spectrum by planned assignment of channel sensing periods. Fairness in such turns may be achieved by allocating clear channel assessment (CCA) attempts to different deployments in such a way that access turns may be shared with close to equal probability. In such systems, a given Deployment A would be assigned a CCA period ahead of Deployment B with the same probability as Deployment B being assigned a CCA period ahead of Deployment A.

Figure 5:
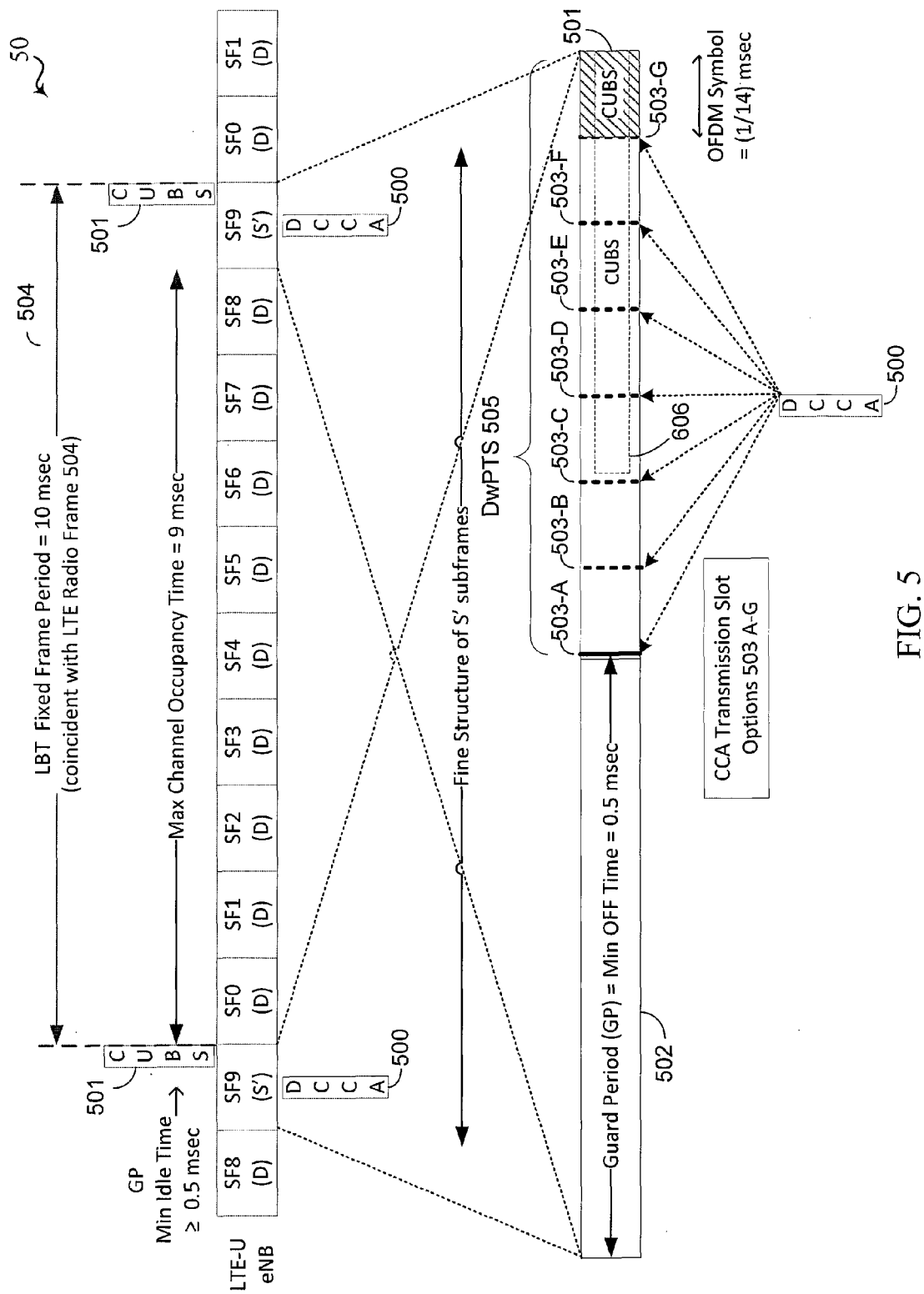
FIG. 5 is a block diagram illustrating transmission stream in a synchronized LTE/LTE-A communication system with unlicensed spectrum.

FIG. 5 is a block diagram illustrating transmission stream 50 in a synchronized LTE/LTE-A communication system with unlicensed spectrum. Transmission stream 50 is divided into LTE radio frames, such as LTE radio frame 504, each of such radio frame further divided into 10 subframes (subframes 0-9) that may be configured for uplink communication (U), downlink communications (D), or a special subframe (S') which includes a uplink pilot time slot (UpPTS) (not shown) that may include uplink communications, a guard period, such as guard period 502, and a downlink pilot time slot (DwPTS) 505 that may include downlink communications. Prior to initiating communications on an unlicensed carrier, the transmitter originating transmission stream 50 transmits downlink CCA (DCCA) 500 in one of seven possible transmission slots, CCA opportunities 503-A-503-G. If the transmitter detects a clear CCA, then the unlicensed channel is occupied by channel usage beacon signal (CUBS) 501 prior to any actual data transmissions from the transmitter. Once a CCA has been conducted, the transmitter will not be required to perform another CCA check for a period of 10 ms, which is incident to a radio frame, such as LTE radio frame 504.

When competing deployments are in the vicinity of the transmitter originating transmission stream 50, the transmitter will be assigned one of CCA opportunities 503-A-503-G, while the competing deployments may be assigned others of the CCA opportunities 503-A-503-G. It is likely that the deployment assigned for CCA in an earlier one of CCA opportunities 503-A-503-G may detect a clear CCA and begin CUBS transmission before the competing deployment attempts CCA. The subsequent CCA attempt will then fail through detection of the CUBS transmission. For example, in an alternate aspect illustrated in FIG. 5, the transmitter is assigned CCA opportunity 503-C for the CCA check. The transmitter detects a clear CCA and immediately begins transmitting CUBS 506. Any competing deployments assigned to any of CCA opportunities 503-D-503-G will detect CUBS 506 and their respective CCA checks will fail.

Figure 6:
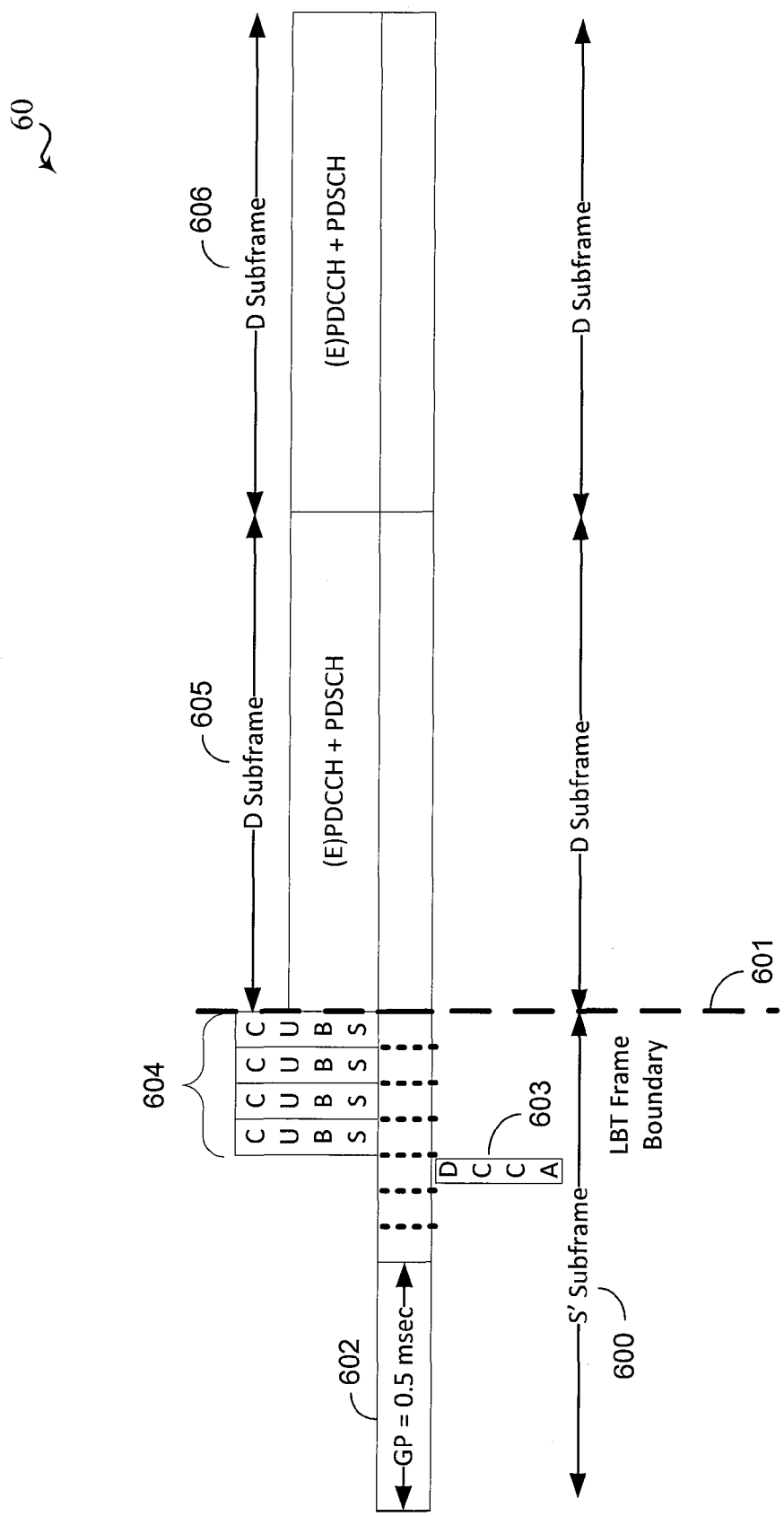
FIG. 6 is a block diagram illustrating transmission stream in a synchronized LTE/LTE-A communication system with unlicensed spectrum.

FIG. 6 is a block diagram illustrating transmission stream 60 in a synchronized LTE/LTE-A communication system with unlicensed spectrum. Transmission stream 60 includes S' subframe 600 during which a CCA period is contained. After guard period 602, the transmitter is assigned to CCA opportunity 603. If the transmitter detects a clear CCA from CCA opportunity 603, then immediately starting at the next symbol, CUBS 604 are transmitted by the transmitter until the end of S' subframe 600 at the LBT frame boundary 601. CUBS 604 provide the channel occupation signal until data transmissions can commence from the transmitter at D subframes 605 and 606. D subframes 605 and 606 includes transmissions of (E)PDCCH and PDSCH. The occupied resources for CUBS 604 may be different than the resources (E)PDCCH or PDSCH or (E)PUCCH or PUSCH that follow. (E)PDCCH/PDSCH would be present when the transmitter is a base station, while (E)PUCCH/PUSCH would be present when the transmitter is a mobile device or UE. In order to improve CCA detection, the total power selected for CUBS 604 should be the same or very similar to the total power used for the data transmissions. This total equal power may result in potentially unequal power spectral density (PSD). Unequal total power may result in failure to accurately decode the data transmissions, as the AGC will be set according to the CUBS.

The main function of CUBS in communication systems employing LBT procedures is to reserve the channel. Additionally, CUBS may be used to help setting AGC at the receiver. From these perspectives, any signal spanning 80% of channel bandwidth would be sufficient. A third function of the CUBS provides notice to the receiver that the CCA check succeeded. With this information, a receiver can expect data transmissions from the transmitter.

Various aspects of the present disclosure provide for additional information to be encoded in CUBS. However, because CUBS is also used for AGC setting, simultaneous AGC setting and CUBS 'decoding' may not be possible. With this assumption, no information essential to receiver operation should be carried in CUBS. The various aspects of the present disclosure provide for a single bit of information to be carried in CUBS transmissions. This single bit may indicate whether the frame is 5 ms or 10 ms, which, while useful to a receiver, is not essential information.

FIG. 7A is a functional block diagram illustrating example blocks executed to implement one aspect of the present disclosure. At block 700, a transmitter preparing for transmission of a set of data over an unlicensed band detects a clear CCA in a CCA opportunity assigned to the network of the transmitter. In preparation for transmissions in the network over unlicensed spectrum, the LBT requirements provide for the transmitter to first perform and receive a clear CCA before transmitting data.

At block 701, the transmitter selects a configuration of a channel usage beacon signal (CUBS) associated with the transmitter based on the CCA opportunity assigned to the network of the transmitter, wherein the configuration of the CUBS associated with the transmitter includes a set of frequency subcarriers for CUBS transmissions. At block 702, the transmitter transmits the CUBS according to transmission characteristics based on the CCA opportunity.

It should be noted that in various aspects of the present disclosure the set of frequency subcarriers for CUBS transmission is a subset of all subcarriers available for CUBS transmission. In some aspects, the subset of all subcarriers available for CUBS transmission is a set with an equal subcarrier spacing, where the equal subcarrier spacing may be three subcarriers spacing. In other aspects, the subset is one of a plurality of non-overlapping subsets, where the number of non-overlapping subsets can be larger than or equal to the total number of available CCA opportunities. In such aspects where the number of non-overlapping subsets is larger than or equal to the total number of available CCA opportunities, each CCA opportunity is associated with a unique non-overlapping subset of the plurality of non-overlapping subsets.

In additional aspects of the present disclosure, the number of non-overlapping subsets is smaller than the number of the total number of available CCA opportunities, where the association between each CCA opportunity and the plurality of non-overlapping subsets is time slot dependent. In such aspects, there may be a time slot for each CCA opportunity in which the CCA opportunity is mapped to a non-overlapping subset of the total number of non-overlapping subsets to which no other CCA opportunity is mapped. In related aspects, the time slot is a first occasion of CUBS transmission associated with the CCA opportunity.

It should further be noted that in additional aspects of the present disclosure, the configuration of the CUBS associated with the transmitter includes one or more frequency domain sequences in each time slot of the CUBS transmission.

FIG. 7B is a functional block diagram illustrating example blocks executed to implement one aspect of the present disclosure. At block 703, a transmitter performs a CCA check and detects a clear CCA in a CCA opportunity assigned to the network in which the transmitter operates. As noted above, in prepare for transmissions in the network over unlicensed spectrum, the LBT requirements provide for the transmitter to first perform and receive a clear CCA before transmitting data.

At block 704, the transmitter determines an expected duration of the contemplated transmission of the set of data to be transmitted. After each successful CCA check, a transmitter may transmit data for up to 10 ms, when it will perform a subsequent CCA check before continuing transmissions. However, in certain circumstances, a transmitter may not have enough data for transmission to occupy the entire 10 ms. As such, the transmitter may determine how long of a transmission time is expected.

At block 705, the transmitter selects a configuration of a CUBS that it is associated with based on the expected duration of the transmission. If the expected duration of transmission is less than or equal to 5 ms, then it may be beneficial to notify the receiver that the transmission will be no longer than 5 ms. Various synchronization signals and reference signals (e.g., PSS/SSS, CRS, CSI-RS, etc.) are transmitted over the entire 10 ms transmission. A receiver will expect such system signals at known locations in each half of the 10 ms transmission. If the transmitter is only transmitting for 5 ms, then the receiver will waste power attempting to detect the system signals that it expects in the second half of the full transmission. Accordingly, if the receiver is informed that the transmitter is only transmitting for no longer than 5 ms, then, as soon as the 5 ms has passed, the receiver may switch off the receiving components and conserve power. The configuration of the CUBS selected by the transmitter will then indicate to the receiver either that the data transmission will be 5 ms or 10 ms.

At block 706, the transmitter transmits the CUBS according to transmission characteristics based on the CCA opportunity. In current operation, seven CCA opportunities exist within the special subframes. A PLMN that has been assigned the first or second CCA opportunity will be capable of transmitting CUBS over each of the remaining symbols of the subframe. Thus, the opportunity for detection will be great. However, PLMN that are assigned later CCA opportunities will only be able to transmit CUBS over a few or even one symbol, in the case of the seventh CCA opportunity. These CUBS have less of an opportunity for detection than the CUBS from PLMN with earlier assigned CCA opportunities. As such, there may be difficulties detecting the CUBS in the later CCA opportunities. Accordingly, various transmission characteristics may be selected, based on the particular CCA opportunity, for transmitting the CUBS. These transmission characteristics are selected to equalize CUBS detection across all of the CCA opportunities. For example, the gain or power selected for CUBS transmissions may monotonically increase from the first CCA opportunity to the last. Alternatively, separate orthogonal channels may be created for each CCA opportunity, such that detection would be improved at any of the different opportunities.

For the receiver, CUBS detection allows the receiver to consider a decision among three hypotheses, (1) the transmitter in communication with the receiver is not transmitting CUBS; (2) the transmitter in communication with the receiver transmits CUBS indicating data transmission of up to a 5 ms frame; and (3) the transmitter in communication with the receiver transmits CUBS indicating data transmission of a 10 ms frame. In a 5 ms frame, only the first CRS subframe is transmitted, only the first PSS/SSS is transmitted, and only the CSI-RS is transmitted in the first half-frame. In a 10 ms frame, both CRS subframes are transmitted, both PSS/SSS occasions are transmitted, and all CSI-RS are transmitted. Thus, the CUBS configuration that indicates to the receiver whether a 5 ms data transmission frame or 10 ms data transmission frame is expected allows the receiver to only attempt to detect the system signals that it should expect to receive. A receiver may discover this information on its own by using CRS-based activity detection. However, this self-discovery comes at the cost of additional receiver power. The CUBS detection that includes the 1-bit configuration information enables faster turn off, and, thus, saves power.

Figure 8:
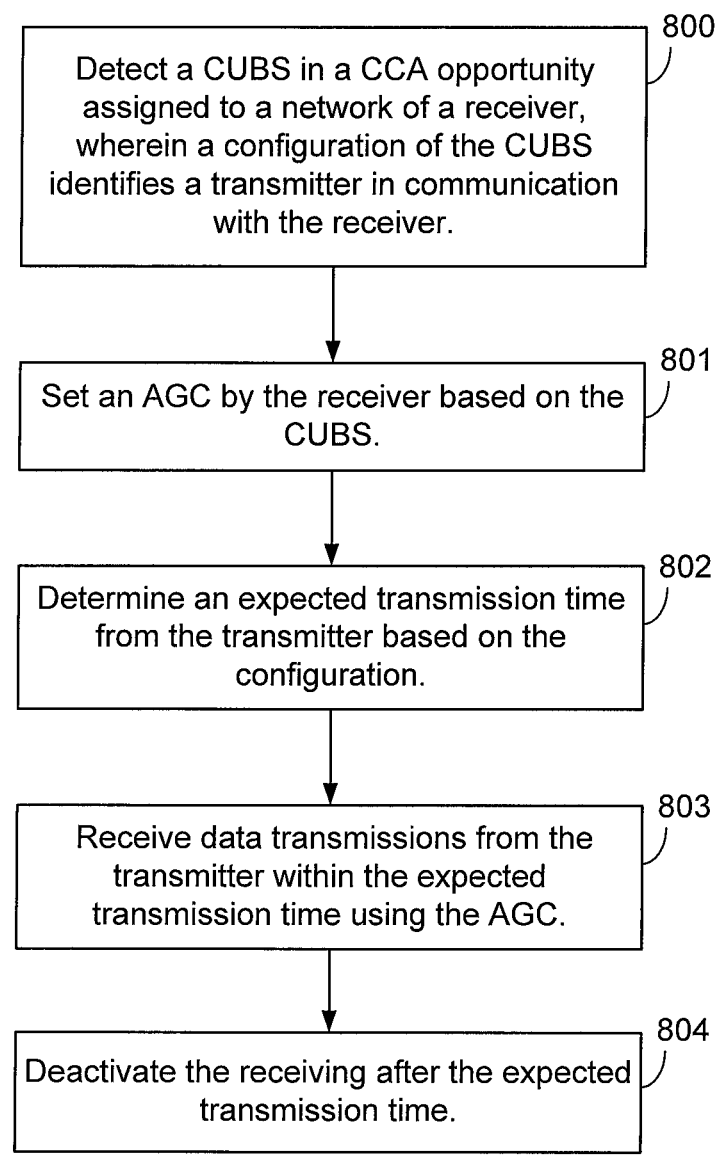
FIG. 8 is a functional block diagram illustrating example blocks executed to implement one aspect of the present disclosure.

FIG. 8 is a functional block diagram illustrating example blocks executed to implement one aspect of the present disclosure. At block 800, a receiver detects a CUBS in a CCA opportunity that is assigned to the network in which the receiver operates. Moreover, the CUBS is specifically identifiable from the transmitter with which the receiver is communicating. Each of the various PLMN transmitters may be CUBS that identify the particular transmitter of origin. Because the CCA opportunities are assigned based on PLMN, the receiver knows which CCA opportunity to begin searching for the CUBS associated with its transmitter. The detection, by the receiver, of the CUBS associated with the transmitter indicates to the receiver that the transmitter detected a clear CCA and will begin transmitting data at the start of the next transmission subframe.

At block 801, the receiver uses the CUBS to set its AGC in order to properly receive and decode the expected data transmissions. At block 802, the receiver determines an expected transmission time from the transmitter based on the configuration of the CUBS. In addition to the configuration of the CUBS identifying the particular transmitter from which it was transmitted, the configuration of the CUBS also indicates, as noted above, whether the data transmission will be 5 ms or 10 ms.

At block 803, the receiver receives the data transmissions from the transmitter within the expected transmission time. The data transmissions are received and decoded using the AGC that was set from the CUBS detection. At block 804, after the expected transmission time, the receiver deactivates its receiving components in order to conserve power. Because the receiver knows in advance, based on the configuration of the CUBS, the duration of the data transmission from the transmitter, it may deactivate various receiving components to conserve power. Thus, if the configuration indicates that the transmission will be 5 ms, then the receiver will know not to expect system signals in the second half of the 10 ms frame and turn off its receiving components for the second half of the time period.

Ideally CUBS should be a signal that is resilient to time and frequency tracking errors. Because transmission is not guaranteed when using unlicensed bandwidth, there may have been a long period since the transmitter has transmitted any data before the CUBS. However, because CUBS is used to set the AGC of the receiver, it may not be practical to require the receiver to set the AGC and decode complex information encoded into the CUBS. As such, CUBS detection may be characterized as best efforts and not essential.

In one aspect for improving the detection of CUBS, CUBS may be transmitted using various transmit diversity schemes. For example, CUBS may be transmitted from two antennas in a frequency division multiple (FDM) fashion, similar to two-port common reference signal (CRS). Alternatively, CUBS may be transmitted over multiple antennas using a single port with a time offset between CUBS in a cyclic delay diversity (CDD) configuration. Thus, various transmit diversity schemes may be applicable to the various aspects of the present disclosure.

In additional aspects of the present disclosure, it may be beneficial to maintain commonality or similarity between CUBS and CRS and or CSI-RS processing. By maintaining a commonality or similarity to such reference signal processes the complexity of handling CUBS may be reduced. However, channel estimation averaging between CUBS and CRS would not be assumed. Instead, this averaging may be prevented by providing different antenna virtualization (e.g., CDD), different virtual offsets (e.g., v_shift), and the like. In one example aspect, a CRS-like structure may be assumed for CUBS transmission. Considering two antennas, a CRS signal is transmitted every six resource elements on each antenna. For example, Antenna 0 transmits on resource elements k, k+6, k+12, . . . , and Antenna 1 transmits on resource elements k+3, k+9, k+15, . . . . In consideration of the total CRS transmissions, a CRS transmission occurs every three resource elements, k, k+3, k+6, k+9, k+12, k+15 . . . . CUBS may be transmitted in a similar fashion. Moreover, different sets of CUBS transmissions may be offset using the unused resource elements, k+1 and k+2, between k and k+3. The three starting resource elements for CUBS transmissions are referred to as pattern offsets that include the v_shift values, a, b and c, where a=k, b=k+1, and c=k+2. Therefore, in allocating resource elements for CUBS transmission in assigned CCA occasions, the following configuration table may be used:

TABLE 1

PLMN assigned to the $1^{st}$ CCA occasion transmits CUBS on REs: a, a, c, c, c, c
PLMN assigned to the $2^{nd}$ CCA occasion transmits CUBS on REs: 0, b, b, c, c, c, c
PLMN assigned to the $3^{rd}$ CCA occasion transmits CUBS on REs: 0, 0, a, a, c, c, c
PLMN assigned to the $4^{th}$ CCA occasion transmits CUBS on REs: 0, 0, 0, b, b, c, c
PLMN assigned to the $5^{th}$ CCA occasion transmits CUBS on REs: 0, 0, 0, 0, a, a, c,
PLMN assigned to the $6^{th}$ CCA occasion transmits CUBS on REs: 0, 0, 0, 0, 0, b, b,
PLMN assigned to the $7^{th}$ CCA occasion transmits CUBS on REs: 0, 0, 0, 0, 0, 0, a, Where, the pattern offset c' provides resources for multiple different colliding CUBS transmissions that are no longer used for detection.

Figure 9A:
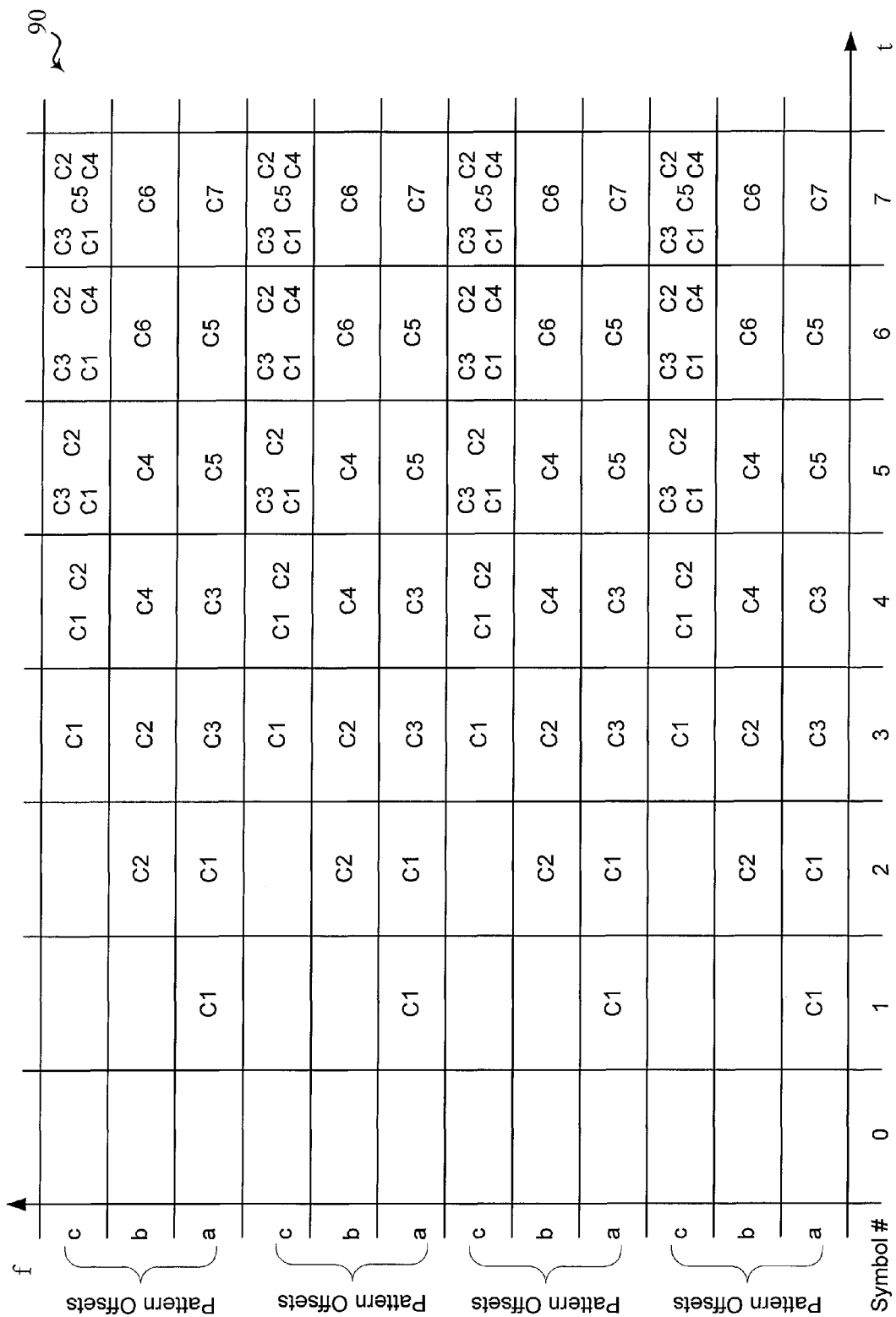
FIGS. 9A and 9B are block diagrams illustrating a transmission stream including the available CCA opportunities across time and frequency configured according to aspects of the present disclosure.

FIG. 9A is a block diagram illustrating a transmission stream 90 including the available CCA opportunities across time and frequency configured according to one aspect of the present disclosure. Across time there are seven CCA opportunities illustrated, symbols 1-7, each, such symbol having multiple resource elements over the multiple frequencies for each symbol. The pattern offsets, a, b, c are repeated to illustrate the a-pattern, b-pattern, and c-pattern of CUBS transmissions according to Table 1. For example, the PLMN assigned to the $1^{st}$ CCA occasion, at symbol 1, will transmit CUBS, C1, at every third resource element beginning at the pattern offset 'a'. As illustrated in FIG. 9, C1 is shown every third resource element associated with the a-pattern. Similarly, the PLMN assigned to the $4^{th}$ CCA occasion, at symbol 4, will transmit CUBS, C4, at every third resource element beginning at the pattern offset 'b'. The pattern offsets 'a' and 'b' are considered clean resource elements. Each of the PLMNs assigned to the seven available CCA opportunities will be capable of transmitting CUBS at least once in pattern offsets 'a' or 'b'. This provides each PLMN a good opportunity for CUBS detection, even at the $7^{th}$ CCA occasion, in which C7 will be transmitted every third resource element without any colliding CUBS.

As noted above, one aspect of the present disclosure provides for each successive CCA occasion to be transmitted using a monotonically increasing gain or power. Depending on the location of a neighboring PLMN, the increased power may cause substantial interference with PLMNs assigned to earlier CCA opportunities. Accordingly, a receiver may be able to adjust operation or discover the presence of dominant PLMN interferers based on CUBS detection of the neighboring PLMN transmitters.

In additional aspects of the present disclosure, alternative resource allocation patterns may also be used for CUBS transmissions. In one such alternative, allocating resource elements for CUBS transmission in assigned CCA occasions may be provided for as in the following configuration table:

TABLE 2

Figure 9B:
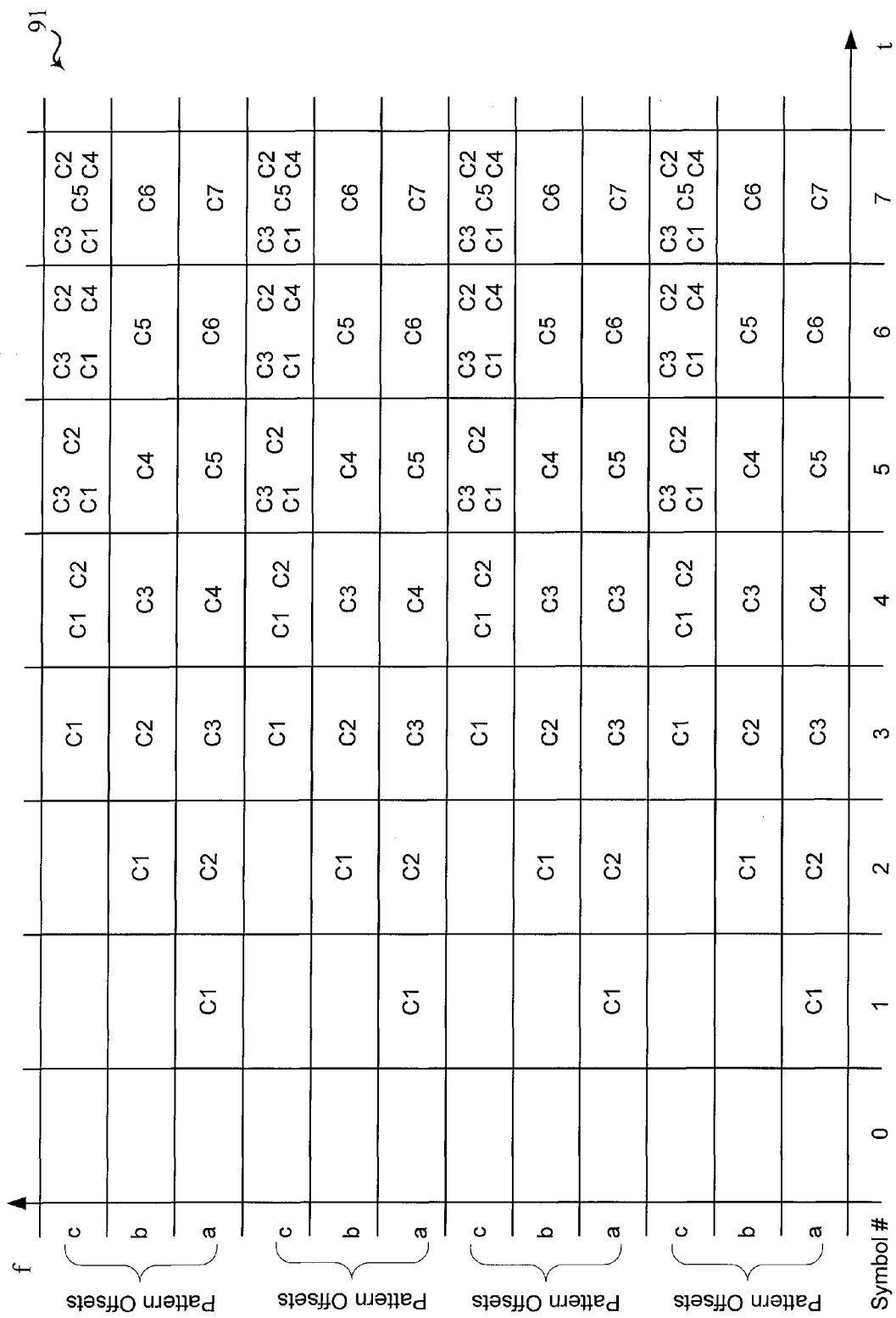

PLMN assigned to the $1^{st}$ CCA occasion transmits CUBS on REs: a, b, c, c, c, c, c
PLMN assigned to the $2^{nd}$ CCA occasion transmits CUBS on REs: 0, a, b, c, c, c, c
PLMN assigned to the $3^{rd}$ CCA occasion transmits CUBS on REs: 0, 0, a, b, c, c, c
PLMN assigned to the $4^{th}$ CCA occasion transmits CUBS on REs: 0, 0, 0, a, b, c, c
PLMN assigned to the $5^{th}$ CCA occasion transmits CUBS on REs: 0, 0, 0, 0, a, b, c,
PLMN assigned to the $6^{th}$ CCA occasion transmits CUBS on REs: 0, 0, 0, 0, 0, a, b,
PLMN assigned to the $7^{th}$ CCA occasion transmits CUBS on REs: 0, 0, 0, 0, 0, 0, a FIG. 9B is a block diagram illustrating a transmission stream 91 including the available CCA opportunities across time and frequency configured according to one aspect of the present disclosure. The seven CCA opportunities, symbols 1-7, are illustrated with each such symbol having multiple resource elements over the multiple frequencies for each symbol. The pattern offsets, a, b, c are repeated to illustrate the a-pattern, b-pattern, and c-pattern of CUBS transmissions according to Table 2. For example, the PLMN assigned to the $1^{st}$ CCA occasion, at symbol 1, will transmit CUBS, C1, at every third resource element beginning at the pattern offset 'a' in symbol 1, followed by transmitting at pattern offset 'b' in symbol 2, and then transmitting at pattern offset 'c' for the remaining symbols 3-7. As illustrated in FIG. 9B, C1 is shown every third resource element associated with the same a, b, c, c, c, c, c pattern. Similarly, for example, the PLMN assigned to the $4^{th}$ CCA occasion, at symbol 4, will transmit CUBS, C4, at every third resource element also beginning at the pattern offset 'a', followed by transmission at symbol 5 at pattern offset 'b', and then transmissions at symbols 6 and 7 at pattern offset 'c'. Thus, each of the PLMNs assigned to the first six available CCA opportunities will be capable of transmitting CUBS at least once in pattern offset 'a' and once in pattern offset 'b', while the PLMN assigned to the seventh available CCA opportunity will be capable of transmitting CUBS once in pattern offset 'a'. This provides each PLMN a good opportunity for CUBS detection, even at the $7^{th}$ CCA occasion, in which C1-C2 will have non-colliding CUBS transmissions in every third resource element at pattern offsets 'a' and 'b' and C7 will have non-colliding CUBS transmissions in every third resource element at pattern offset 'a'.

It should be noted that aspects of the present disclosure configured according to Table 2 may provide receivers configured to look to different pattern offsets for the consecutive "clean" CUBS transmissions. In contrast, aspects of the present disclosure configured according to Table 1 may provide receivers configured to combine the signals received in consecutive "clean" CUBS transmission symbols to accurately decode the transmission.

While the structures of the CUBS transmission assignment illustrated in FIGS. 9A and 9B using the pattern offsets 'a', 'b', and 'c' are CRS-like, the tone allocations of the pattern offsets for CUBS transmissions according to various aspects of the present disclosure are not necessarily dependent on the physical cell identifier (PCI) of the cell. In typical deployments, tone allocation for the CRS pilot signals is PCI-dependent. However, in the various aspects of the present disclosure the tone allocation through the pattern offsets 'a', 'b', and 'c' are not necessarily PCI-dependent. Different aspects of the disclosure may provide for any combination of PCI-dependent and non-PCI-dependent tone allocations. For example, with regard to transmission stream 90 (FIG. 9A), the tone allocations of symbols 1 and 2 may be PCI-dependent while the tone allocations for the remaining symbols 3-7 may be non-PCI-dependent. In contrast, the tone allocation for each of the symbols in transmission stream 91 (FIG. 9B) may be non-PCI-dependent.

The tone allocations and transmission assignments presented in Tables 1 and 2 and FIGS. 9A and 9B successfully implement various aspects of the present disclosure involving multiple mobile network operators (MNOs) having assigned PLMNs. However, because the tones in each symbol location of the CCA opportunities are specifically assigned to particular PLMN networks, the allocation configurations in Tables 1 and 2 may fail when all of the PLMN networks are not synchronized. Thus, one PLMN network assigned for a "clear" 'a' pattern offset transmission may experience excessive interference from multiple other PLMN networks that either may be transmitting on 'c' pattern offsets or believe to be transmitting on a 'b' pattern offset.

Such interference may also arise in synchronized systems where a fixed interfering transmitter transmits interfering signals during one of the "clear" pattern offsets. In such an aspect, any PLMN network attempting a "clear" CUBS transmission may experience interference from the fixed frequency source.

According to various alternative aspects of the present disclosure, randomization may be introduced into the v_shift parameter for the pattern offsets in order to minimize persistent collisions with other fixed frequency interferers or in providing. By including randomization, transmitting PLMN networks may be allocated for "clear" tones that avoid the fixed frequency interference, when the non-randomized tone would collide with the frequency of the interference. Moreover, randomization would provide a virtual v_shift for PLMN networks that are not synchronized. For example, the virtual v_shift values may be mapped to a physical v_shift value by pseudorandom permutations. Considering the three pattern offset elements, 'a', 'b', and 'c', there are six possible permutations of those three pattern offset elements. Therefore, one permutation may be assigned to each of the symbol periods assigned for CCA transmission opportunities, forming a random permutation sequence.

Figure 12:
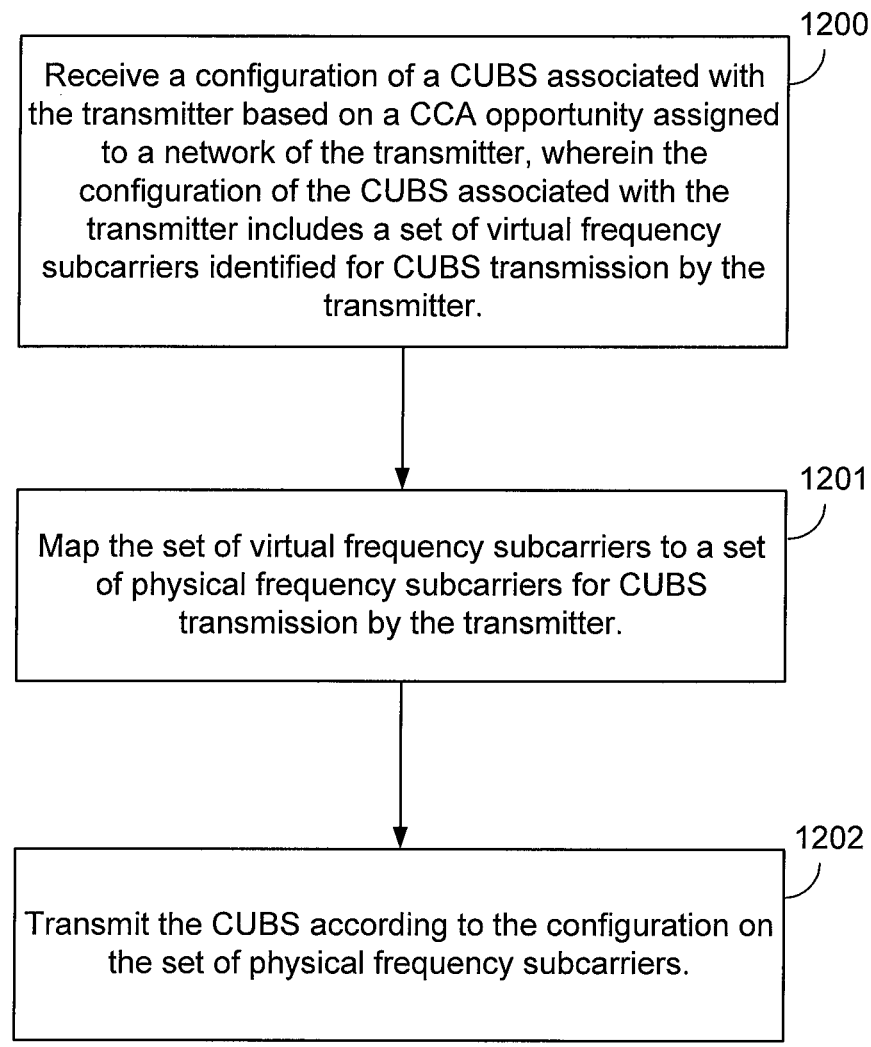
FIG. 12 is a functional block diagram illustrating example blocks executed to implement one aspect of the present disclosure.

FIG. 12 is a functional block diagram illustrating example blocks executed to implement one aspect of the present disclosure. At block 1200, a transmitter receives a configuration of a CUBS associated with the transmitter based on a CCA opportunity assigned to a network of the transmitter. The CUBS configuration includes a set of virtual frequency subcarriers identified for CUBS transmission by the transmitter. The configuration including the set of virtual frequency subcarriers provides the transmission sequence, such as the configurations illustrated in Tables 1 and 2. These virtual frequency subcarriers are the assigned pattern offsets for the sequence of CUBS transmissions associated with the particular assigned CCA opportunity.

At block 1201, the transmitter maps the set of virtual frequency subcarriers to a set of physical frequency subcarriers for CUBS transmission by the transmitter. Using pseudorandom permutations of the pattern offsets, the transmitter maps the virtual frequency subcarriers to actual physical frequency subcarriers that will be used by the transmitter to transmit the CUBS.

At block 1202, the transmitter transmits the CUBS according to the configuration on the set of physical frequency subcarriers. Once the transmitter maps the virtual pattern offsets to the physical pattern offsets or frequency subcarriers, it may then transmit CUBS according to the transmission sequence in the CUBS configuration using the physical frequency subcarriers.

Figure 10:
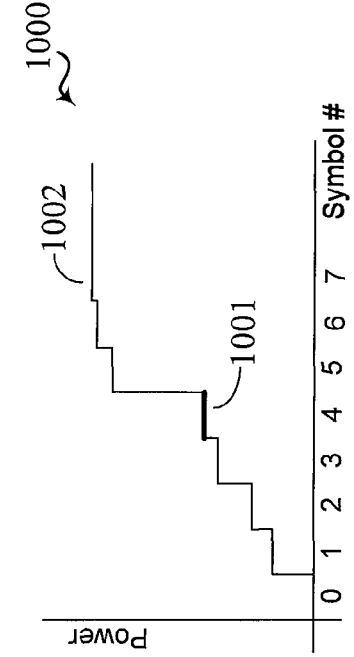
FIG. 10 is a diagram illustrating the observed power levels over the available CCA opportunities according to one aspect of the present disclosure.

FIG. 10 is a diagram 1000 illustrating the observed power levels over the available CCA opportunities according to one aspect of the present disclosure. A receiver, such as a receiver in a PLMN network assigned for the CCA opportunity of symbol 4—1001, may detect the higher power level of a CUBS transmitted at symbol 7—1002, from a neighboring PLMN transmitter. When a serving CUBS is detected at symbol 4—1001, the UE may use the observed power difference between symbol 4—1001 and symbol 7—1002. Based on the observed power difference detected, the receiver may adjust operations accordingly. For example, if the observed power difference is small, then the receiver may proceed into receiving its own data transmissions without using interference cancelation. If the observed power difference is large, then the receiver may proceed into receiving the data transmissions using interference cancelation techniques. In additional aspects, if the receiver observes a very high or maximum power difference, it may even decide to completely abandon the frame. Thus, by detecting and analyzing the detected CUBS from neighboring PLMN transmitters, a receiver may learn about the presence of dominant other PLMN interferers and adjust its operations accordingly.

Figure 11B:
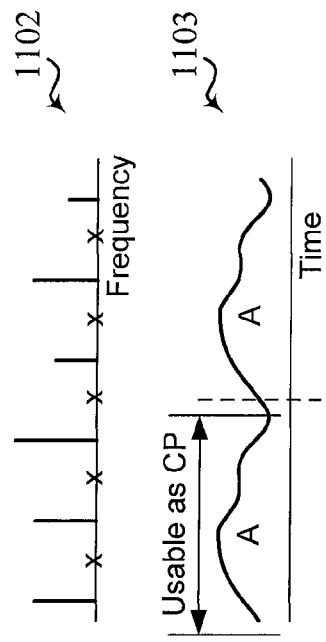
FIGS. 11A-11C are time/frequency diagrams illustrating CUBS transmissions configured according to one aspect of the present disclosure.
Figure 11A:
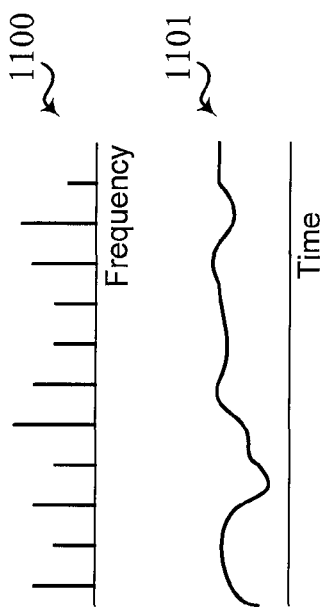
Figure 11C:
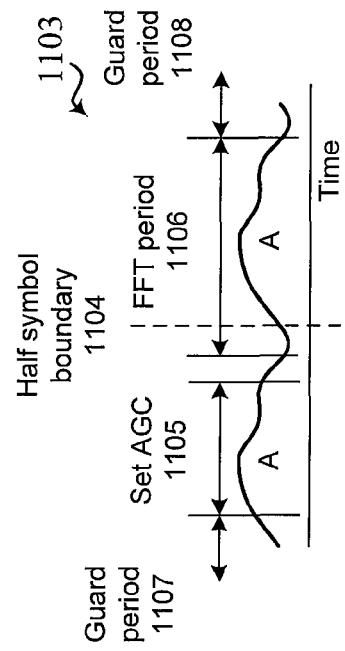

As previously indicated, there may be occasions where a transmitter has not transmitted data for a long period of time because of failed CCA attempts. In such aspects, the timing or synchronization of the CUBS may be substantially different. In order to improve detection of such CUBS, it may be beneficial to indirectly lengthen the cyclic prefix included with the CUBS transmission. In one aspect of the present disclosure, the cyclic prefix may be lengthened for CUBS transmissions by making each CUBS transmission a self-repeating signal. FIGS. 11A-11C are time/frequency diagrams illustrating CUBS transmissions configured according to one aspect of the present disclosure. At FIG. 11A, the frequency domain CUBS signal 1100 is shown with its corresponding time domain CUBS signal 1101. Time domain CUBS signal 1101 is shown as a continuous signal across the entire symbol transmission time. In order to make time domain CUBS signal 1101 into a self-repeating signal, the tone mapping of the frequency domain signal may be scaled up by setting every odd-numbered resource element to zero. At FIG. 11B, each of the odd resource elements of frequency domain CUBS signal 1102 has been set to zero, illustrated as an 'X'. This scaled up version of frequency domain CUBS signal 1102 results in a corresponding time domain CUBS signal 1103, which is a self-repeating signal repeating signal portion 'A' in each half of the symbol transmission. Because time domain CUBS signal 1103 is now self-repeating, the first portion 'A' may be used as the lengthened CP.

At FIG. 11C, the receiver receives time domain CUBS signal 1103 having a first portion 'A' and a second portion 'A' on either side of the half-symbol boundary 1104. The receiver uses first portion 1105 to set its AGC and, uses the second portion 1106 as a half-sized FFT period. Because the FFT period is half-sized, the receiver may run a half-sized FFT, which may save processing power. In alternative aspects, if a full-sized FFT is used, the receiver may cyclically extend the second portion 1106 to fill the full-sized FFT period and perform a full-sized FFT.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 7:
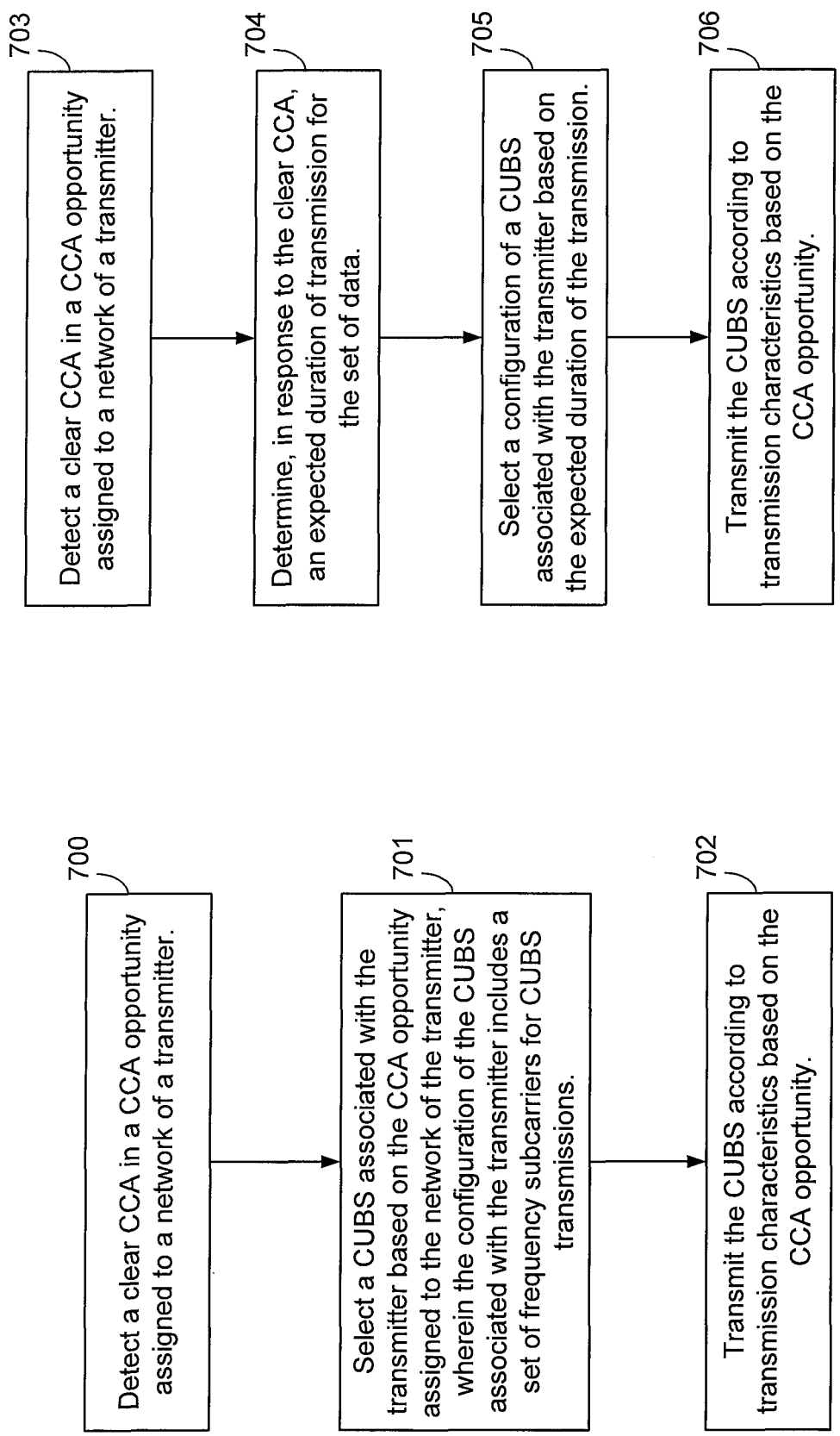
FIGS. 7A and 7B are a functional block diagrams illustrating example blocks executed to implement aspects of the present disclosure.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    detecting, by a transmitter in preparation for transmission of a set of data over an unlicensed band, a successful clear channel assessment (CCA) in a CCA opportunity assigned to a network of the transmitter;
    determining, by the transmitter in response to the successful CCA, an expected duration of transmission for the set of data;
    selecting, by the transmitter, a configuration of a channel usage beacon signal (CUBS) associated with the transmitter based on the CCA opportunity assigned to the network of the transmitter and the expected duration of the transmission, wherein the configuration of the CUBS associated with the transmitter includes a set of frequency subcarriers for CUBS transmissions; and
    transmitting, by the transmitter, the CUBS according to transmission characteristics based on the CCA opportunity.

2. The method of claim 1, wherein the set of frequency subcarriers for CUBS transmission is a subset of all subcarriers available for CUBS transmission.

3. The method of claim 2, wherein the subset is one of a plurality of non-overlapping subsets.

4. The method of claim 3, wherein a number of the plurality of non-overlapping subsets is larger or equal to a number of a total number of available CCA opportunities.

5. The method of claim 4, wherein each CCA opportunity is associated with a unique non-overlapping subset of the plurality of non-overlapping subsets.

6. The method of claim 3, wherein a number of the plurality of non-overlapping subsets is smaller than a number of the total number of available CCA opportunities.

7. The method of claim 6, wherein an association between each CCA opportunity and the plurality of non-overlapping subsets is time slot dependent.

8. The method of claim 7, wherein there is a time slot for each CCA opportunity in which the CCA opportunity is mapped to a non-overlapping subset of the plurality of non-overlapping subsets to which no other CCA opportunity is mapped.

9. The method of claim 1, wherein the selecting the configuration includes:
    selecting a first configuration, when the expected duration fails to exceed a predetermined time; and
    selecting a second configuration, when the expected duration exceeds the predetermined time.

10. The method of claim 1, wherein the transmitting according to transmission characteristics includes:
    transmitting the CUBS in each of one or more symbols of a subframe associated with the CCA opportunity, wherein the transmitting begins in a first symbol of the one or more symbols related to the CCA opportunity.

11. The method of claim 1, wherein the transmitting according to transmission characteristics includes:
    selecting an orthogonal channel from a plurality of orthogonal channels associated with a set of available CCA opportunities, wherein the selected orthogonal channel corresponds to the CCA opportunity in which the transmitter detected the successful CCA.

12. The method of claim 1, wherein the transmitting according to transmission characteristics includes:
    transmitting, by the transmitter, the CUBS over two or more antennas, wherein the CUBS transmitted over each of the two or more antennas is phase shifted from the CUBS transmitted over the other of the two or more antennas.

13. The method of claim 1, wherein the transmitting according to transmission characteristics includes:
    transmitting, by the transmitter, the CUBS is transmitted over two or more antennas using a single port, wherein each CUBS transmitted is time offset from each other.

14. The method of claim 1, further including:
    generating the CUBS by:
        setting each odd-numbered resource elements of a frequency tone map of the CUBS to zero; and
        transforming the frequency tone map of the CUBS into a time domain signal prior to the transmitting, wherein the time domain signal includes a lengthened cyclic prefix.

15. A non-transitory computer-readable medium having program code recorded thereon, the program code comprising:
    program code for causing a computer to detect, by a transmitter in preparation for transmission of a set of data over an unlicensed band, a successful clear channel assessment (CCA) in a CCA opportunity assigned to a network of the transmitter;
    program code for causing a computer to determine, by the transmitter in response to the successful CCA, an expected duration of transmission for the set of data;
    program code for causing the computer to select, by the transmitter, a configuration of a channel usage beacon signal (CUBS) associated with the transmitter based on the CCA opportunity assigned to the network of the transmitter and the expected duration of the transmission, wherein the configuration of the CUBS associated with the transmitter includes a set of frequency subcarriers for CUBS transmissions; and
    program code for causing the computer to transmit, by the transmitter, the CUBS according to transmission characteristics based on the CCA opportunity.

16. The non-transitory computer-readable medium of claim 15, wherein the set of frequency subcarriers for CUBS transmission is a subset of all subcarriers available for CUBS transmission.

17. The non-transitory computer-readable medium of claim 16, wherein the subset is one of a plurality of non-overlapping subsets.

18. The non-transitory computer-readable medium of claim 15, further including:
    program code for causing a computer to generate the CUBS by:
        setting each odd-numbered resource elements of a frequency tone map of the CUBS to zero; and
        transforming the frequency tone map of the CUBS into a time domain signal prior to the transmitting, wherein the time domain signal includes a lengthened cyclic prefix.

19. An apparatus configured for wireless communication, the apparatus comprising:
- at least one processor; and
- a memory coupled to the at least one processor,
- wherein the at least one processor is configured:
  - to detect, by a transmitter in preparation for transmission of a set of data over an unlicensed band, a successful clear channel assessment (CCA) in a CCA opportunity assigned to a network of the transmitter;
  - to determine, by the transmitter in response to the successful CCA, an expected duration of transmission for the set of data;
  - to select, by the transmitter, a configuration of a channel usage beacon signal (CUBS) associated with the transmitter based on the CCA opportunity assigned to the network of the transmitter and the expected duration of the transmission, wherein the configuration of the CUBS associated with the transmitter includes a set of frequency subcarriers for CUBS transmissions; and
  - to transmit, by the transmitter, the CUBS according to transmission characteristics based on the CCA opportunity.

20. The apparatus of claim 19, wherein the configuration of the at least one processor to select the configuration includes configuration of the at least one processor:
- to select a first configuration, when the expected duration fails to exceed a predetermined time; and
- to select a second configuration, when the expected duration exceeds the predetermined time.

21. The apparatus of claim 19, wherein the configuration of the at least one processor to transmit according to transmission characteristics includes configuration to transmit the CUBS in each of one or more symbols of a subframe associated with the CCA opportunity, wherein the transmission begins in a first symbol of the one or more symbols related to the CCA opportunity.

22. The apparatus of claim 19, wherein the configuration of the at least one processor to transmit according to transmission characteristics includes configuration to select an orthogonal channel from a plurality of orthogonal channels associated with a set of available CCA opportunities, wherein the selected orthogonal channel corresponds to the CCA opportunity in which the transmitter detected the successful CCA opportunity.

23. The apparatus of claim 19, wherein the configuration of the at least one processor to transmit according to transmission characteristics includes configuration to transmit, by the transmitter, the CUBS over two or more antennas, wherein the CUBS transmitted over each of the two or more antennas is phase shifted from the CUBS transmitted over the other of the two or more antennas.

24. The apparatus of claim 19, wherein the configuration of the at least one processor to transmit according to transmission characteristics includes configuration to transmit, by the transmitter, the CUBS is transmitted over two or more antennas using a single port, wherein each CUBS transmitted is time offset from each other.

25. The apparatus of claim 19, further including configuration of the at least one processor:
- to generate the CUBS by:
  - setting each odd-numbered resource elements of a frequency tone map of the CUBS to zero; and
  - transforming the frequency tone map of the CUBS into a time domain signal prior to the transmitting, wherein the time domain signal includes a lengthened cyclic prefix.

* * * * *